UNITED STATES PATENT OFFICE.

BENNO HOMOLKA, OF FRANKFORT-ON-THE-MAIN, AND ROBERT WELDE, OF HÖCHST-ON-THE-MAIN, GERMANY, ASSIGNORS TO FARBWERKE VORM. MEISTER LUCIUS & BRÜNING, OF HÖCHST-ON-THE-MAIN, GERMANY, A CORPORATION OF GERMANY.

LEUCO BODY CONTAINING SULFUR AND PROCESS OF MAKING SAME.

943,678.  Specification of Letters Patent.  Patented Dec. 21, 1909.

No Drawing.  Application filed March 23, 1909. Serial No. 485,268.

*To all whom it may concern:*

Be it known that we, BENNO HOMOLKA, Ph. D., and ROBERT WELDE, Ph. D., citizens of the Empire of Germany, residing at Frankfort-on-the-Main and Höchst-on-the-Main, Germany, respectively, have invented certain new and useful Improvements in the Manufacture of Leuco Bodies of Dyestuffs Containing Sulfur, of which the following is a specification.

According to A. Baeyer (see *Berichte der Deutschen Chemischen Gesellschaft* XII, 1309), by reducing isatin, the dioxindole

is obtained. In the same way the substituted dioxindoles are obtained from the substituted isatins, for instance from an alkyloxisatin an alkyloxydioxindole

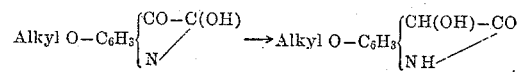

We have now found that the dioxindoles combine with the alpha-oxythionaphthenes of the general formula:

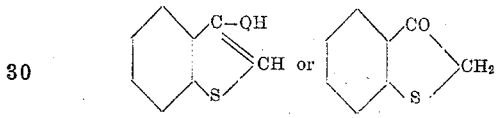

forming leuco bodies of valuable sulfurized vat-dyestuffs. This combination is effected by heating a dioxindole, dissolved or suspended in water, with an alpha-oxythionaphthene; in presence of acids or alkali carbonates the reaction is accelerated. The alpha-oxythionaphthenes may also be used in the form of their beta-carboxylic acids; for instance instead of an alkyloxythionaphthene

its carboxylic acid

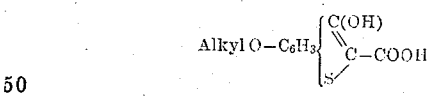

may be employed. In this case the carboxyl group -COOH is split off and the simple or substituted alpha-oxythionaphthene thus formed combines with the simple or substituted dioxindole which is present.

The following examples illustrate the invention:

Example I: A hot solution of 10 parts by weight of dioxindole in about 1000 parts of water, such as the solution which, for instance, is obtained according to Baeyer (see *Berichte der Deutschen Chemischen Gesellschaft* XII, 1309) by reducing isatin with zinc and hydrocholic acid, is mixed with 10 parts of alpha-oxythionaphthene or 15 parts of alpha-oxythionaphthene-beta-carboxylic acid, whereupon carbonate of soda is added until the mixture is alkaline. A mixture of the sulfurized leuco body thus formed with zinc carbonate then separates; this is collected on a filter and the zinc carbonate is separated from it by treating it with a diluted acid. The leuco body remains as a white or reddish crystalline powder. It is slightly soluble in water, readily soluble in alcohol and acetone. In diluted caustic soda lye it dissolves with a yellowish color and this solution, when exposed to the air, yields a red dyestuff.

Example II: A hot solution of 18 parts by weight of methoxydioxindole in about 4000 parts of water, obtained for instance by reducing methoxyisatin by means of zinc in an acid solution, is mixed with 15 parts of methoxy-alpha-oxythionaphthene, or with 20 parts of an alkyloxy-alpha-oxythionaphthene-beta-carboxylic acid and rendered alkaline by means of carbonate of soda. The leuco body thus formed is isolated in the same manner as in Example I. It has properties similar to those described above; from its alkaline solution there separates, on exposure to the air, a dyestuff varying in color from orange-yellow to brown.

Having now described our invention, what we claim is:

1. The process for manufacturing leuco bodies containing sulfur by condensing dioxindoles with alpha-oxythionaphthenes.

2. As a new product, a leuco body containing sulfur, obtainable by condensing a dioxindole with an alpha-oxythionaphthene, being a white or reddish crystalline powder which is slightly soluble in water, soluble in alcohol and acetone and also in diluted caustic alkalies, its solution in caustic alkalies separating, on exposure to the air, an insoluble dyestuff.

In testimony whereof, we affix our signatures in presence of two witnesses.

BENNO HOMOLKA.
ROBERT WELDE.

Witnesses:
JEAN GRUND,
CARL GRUND.